United States Patent
Daswani et al.

(10) Patent No.: US 9,356,946 B1
(45) Date of Patent: *May 31, 2016

(54) DETECTING MALWARE IN MOBILE SITES

(71) Applicant: Twitter, Inc., San Francisco, CA (US)

(72) Inventors: Neilkumar Murli Daswani, San Jose, CA (US); Ameet Ranadive, Fremont, CA (US); Shariq Rizvi, Fremont, CA (US); Michael Gagnon, San Jose, CA (US); Tufan Demir, Santa Clara, CA (US); Gerald E. Eisenhaur, Emeryville, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/445,814

(22) Filed: Jul. 29, 2014

Related U.S. Application Data (63) Continuation of application No. 13/458,974, filed on Apr. 27, 2012, now Pat. No. 8,806,646.

(60) Provisional application No. 61/479,842, filed on Apr. 27, 2011.

(51) Int. Cl.
| | | |
|---|---|---|
| *G06F 12/14* | (2006.01) | |
| *H04L 29/06* | (2006.01) | |
| *H04L 9/32* | (2006.01) | |
| *G06F 21/56* | (2013.01) | |
| *G06F 21/57* | (2013.01) | |

(52) U.S. Cl.
CPC .......... *H04L 63/1425* (2013.01); *G06F 21/566* (2013.01); *G06F 21/577* (2013.01); *H04L 63/1433* (2013.01)

(58) Field of Classification Search
CPC .................. G06F 21/577; H04L 63/1433
USPC ............. 726/23, 25; 713/161, 165, 168, 187, 713/188
See application file for complete search history.

(56) References Cited

U.S. PATENT DOCUMENTS 8,806,646 B1 * 8/2014 Daswani et al. ............... 726/25
2010/0333088 A1 12/2010 Rogel et al.

OTHER PUBLICATIONS

United States Advisory Action, U.S. Appl. No. 13/458,974, Dec. 24, 2013, 3 pages.
United States Office Action, U.S. Appl. No. 13/458,974, Oct. 25, 2013, 7 pages.
United States Office Action, U.S. Appl. No. 13/458,974, Apr. 22, 2013, 10 pages.

* cited by examiner

*Primary Examiner* — Aravind Moorthy
(74) *Attorney, Agent, or Firm* — Fenwick & West LLP (57) ABSTRACT

Behavioral analysis of a mobile webpage is performed to determine whether the webpage is malicious. During analysis, the webpage is visited by an emulated mobile device to cause behaviors to occur which may be malicious. The behaviors occurring after accessing the webpage are stored. The behaviors are classified as hard or soft signals. A probability of the webpage being malicious is determined through combining soft signals, and the webpage is classified as malicious or non-malicious. Users of the webpage, the developer of the webpage, or a distributor of the webpage are notified of the webpage classification to enable responsive action.

15 Claims, 6 Drawing Sheets

DETECTING MALWARE IN MOBILE SITES

CROSS-REFERENCE TO RELATED APPLICATION

This application is a continuation of U.S. patent application Ser. No. 13/458,974, filed Apr. 27, 2012, which claims the benefit of U.S. Provisional Application No. 61/479,842, filed Apr. 27, 2011, the contents of which is hereby incorporated by reference in its entirety.

BACKGROUND

1. Field of Disclosure

The disclosure generally relates to the field of malware detection, in particular to detecting malware in websites, e.g., websites for mobile devices.

2. Description of the Related Art

Many mobile malware attacks have relied on social engineering to encourage users to download malicious files, but an emerging class of automated exploits doesn't require the user to do anything to get infected after visiting a web page. These automated attacks, or drive-by attacks, are preferable to attackers due to the higher rate of infected machines when a user is not required to explicitly click anything. Simply by visiting an infected webpage, a user device may be infected and compromised. Such drive-by attacks are increasingly targeting mobile device based web browser vulnerabilities.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

DETAILED DESCRIPTION

The computing environment described herein enables behavioral scanning of mobile webpages for malware. The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

Configuration Overview

Configurations as disclosed allow for malware detection when computing devices, for example, mobile devices (or mobile computing devices), access a webpage. Mobile devices, as further disclosed herein, include smartphones and tablet computers that can be configured to access mobile webpages (or websites). In one embodiment, the disclosed configuration uses non-behavioral malware detection systems and techniques to analyze and detect whether accessing particular webpages would introduce malware on the mobile device.

Malware can be introduced to a mobile device merely by accessing a webpage from a web browser on a mobile device. For example, a "drive-by" attack, which does not require any interaction from a user beyond accessing a webpage for infection to occur, can occur by taking advantage of a WEBKIT browser engine exploit. An attacker is able to gain backdoor access via such an exploit and issue commands on the mobile device. The attacker is then able to perform malicious actions including retrieving address book data, instant messaging conversations, and other personal data. Other malicious actions that may be performed on a compromised device include key logging, click fraud, and botnet membership.

As disclosed herein, instead of, or in addition to, non-behavioral malware detection, behavioral detection is performed to observe behavior on a mobile device after accessing a webpage. In one embodiment, the behavioral detection is performed on a software emulation platform. The software emulation platform is configured as described herein and allows for customization of the emulated environment, application of user-originated and system events corresponding to how a mobile device functions when accessing particular webpages and/or web sites, recordation and analysis of observed output from those accesses, and optionally provide suggested course of action in response to the analysis, e.g., warnings prior to providing complete access to particular webpages, blocking particular webpages and/or websites, or redirecting from particular webpages. By taking action prior to providing access to the webpages, mobile devices can be spared from those webpages introducing malicious program code that can tax resources such as processor cycles, memory space, or network bandwidth. In turn this provides additional benefits including increasing battery life.

In one embodiment, webpages are examined by a behavioral analysis server emulating a mobile device operating system. This may be performed at the request of the webpage owner, webpage developer, or carrier for a mobile phone. The webpage is examined to determine whether it causes behavior that may be indicative of maliciousness or other behavior that may negatively impact operation of a computing device. Webpages may also be tested periodically to detect malicious behavior that activates after a certain number of uses, after a certain date, after an update to the webpage or in any other conditions that change over time. In one embodiment, behavioral analysis is performed, or is more likely to be performed, on webpages that are popular, recently updated, maintained by an entity or in a domain with a history of malware, or other appropriate criteria. In one embodiment, only webpages intended for viewing on mobile devices are analyzed. However, behavioral analysis may be performed on any webpage that a mobile device is capable of viewing, or attempting to view.

During behavioral analysis, a webpage is visited by a mobile device and the resulting behavior of the mobile device is stored and analyzed. Behavioral analysis may be performed for different amounts of time both to allow a greater amount of simulated user interactions and to activate behaviors that may occur only after the mobile device accessing the webpage has been asleep, the screen has been dimmed, or any other temporally affected behavior has occurred.

Operational Environment

Figure 1:
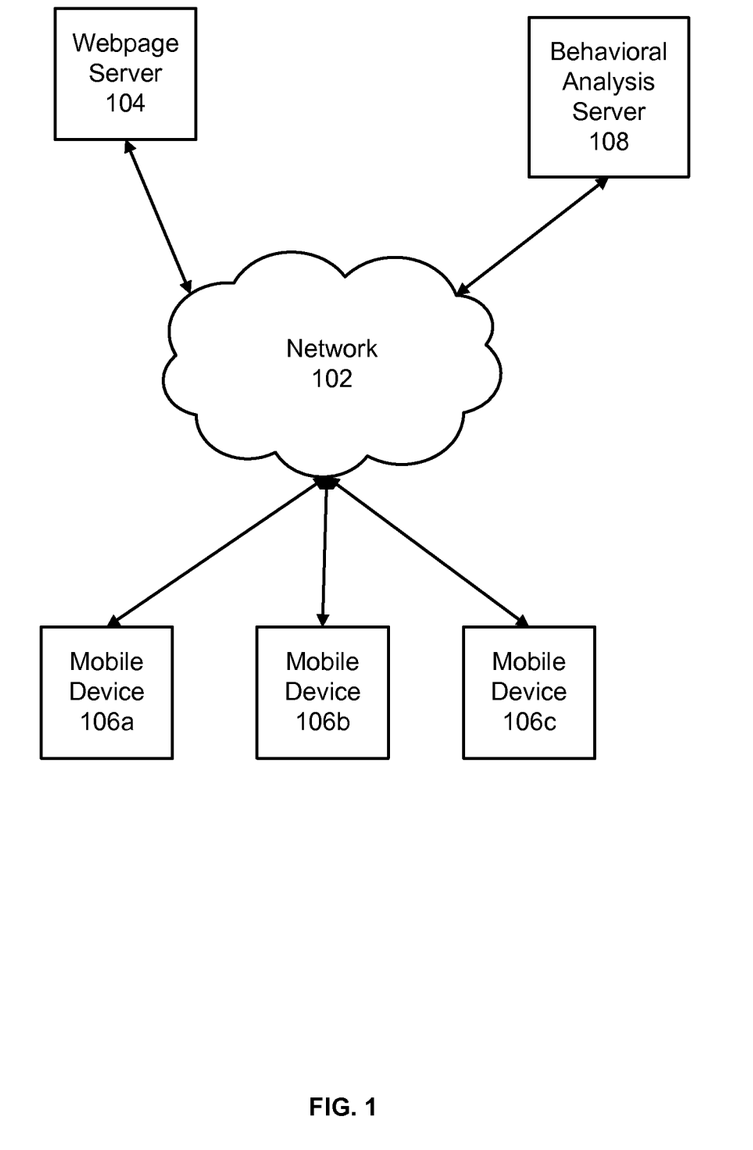
FIG. 1 is a block diagram illustrating a computing environment for detecting malware in websites according to one embodiment of the present disclosure.

Referring to FIG. 1, illustrated is an operational environment for behavioral analysis of webpages. The environment comprises one or more webpage servers 104, mobile devices (or mobile computing devices) 106a-c, behavioral analysis servers 108, and a network 102. An example computing device architecture suitable for the various components in the computing environment of FIG. 1 is further described with respect to FIG. 6. The network 102 can be a data or telecommunications network configured to connect wired or wirelessly with the internet. The internet hosts and allows access to webpages.

Figure 6:
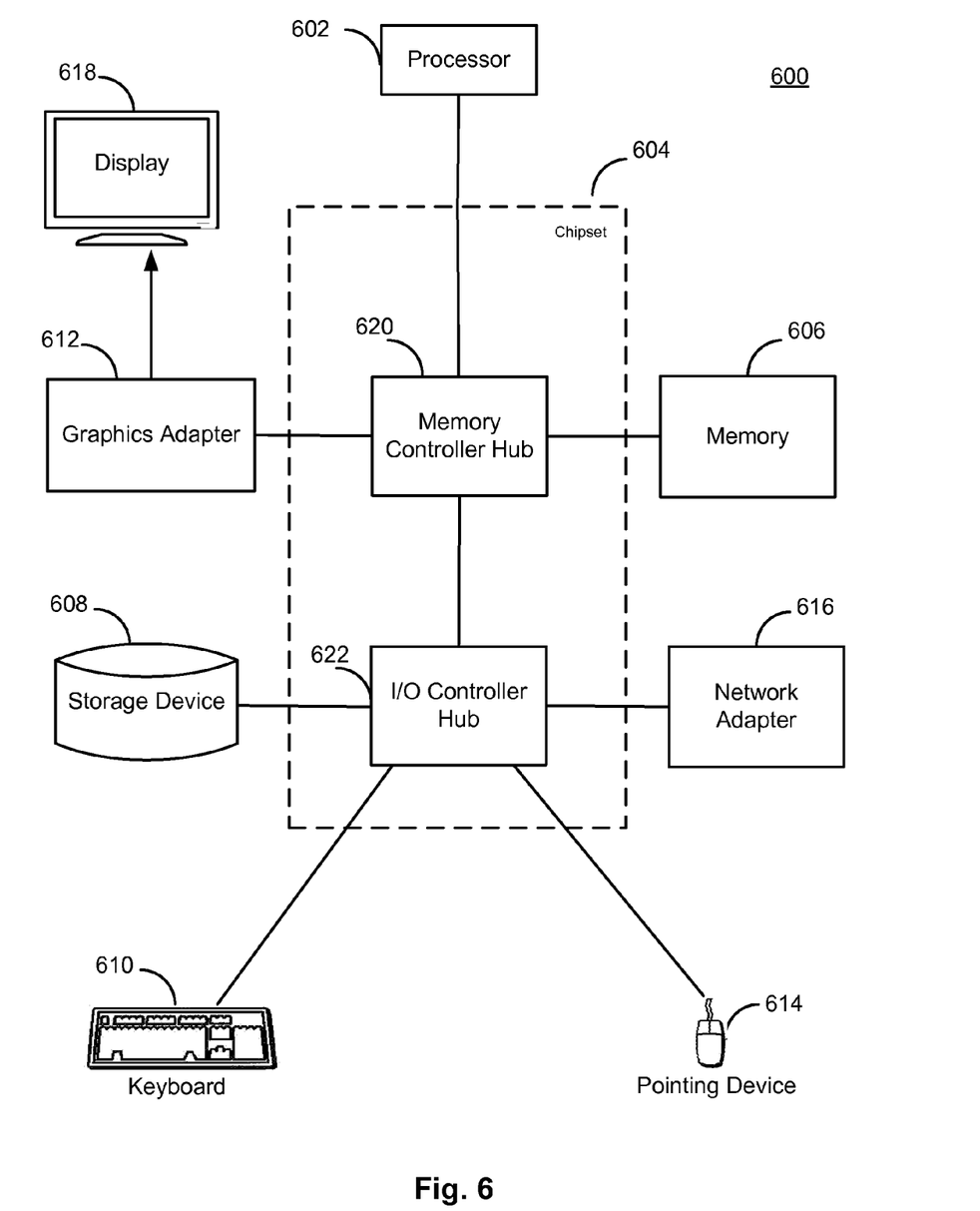
FIG. 6 is a block diagram illustrating an example of a computer for use in the computing environment shown in FIG. 1 according to one embodiment of the present disclosure.

Each of the mobile devices 106a-c (collectively referred to as "mobile device 106") is a computing device with a processor and a memory, e.g., as further described in FIG. 6, that provides users with an interface to receive and interact with content. Examples of clients 106 include a smartphone, a tablet computer, a notebook computer, or a laptop computer. For ease of discussion and understanding, the configurations herein will be described in the context of mobile device 106, although it is noted that the principles described herein with respect to the mobile device 106 can also be applied to larger computing system such as a desktop computer or server computer.

Mobile device 106 typically includes an operating system, for example the ANDROID operating system by GOOGLE INC. of Mountain View, Calif., WINDOWS PHONE by MICROSOFT CORPORATION of Redmond, Wash., BLACKBERRY OS by RESEARCH IN MOTION LIMITED of Waterloo, Ontario, Canada, KINDLE FIRE by AMAZON, INC. of Seattle, Wash., or iOS by APPLE INC. of Cupertino, Calif. Mobile device 106 is configured to run one or more web browsers which may be native to the operating system, installed by default, or downloaded over the network 102. A web browser enables the mobile device 106 to visit web pages over the network 102, which may or may not be intended for viewing on a mobile device. Webpages visited by the browser on a mobile device 106 may contain malware causing nefarious actions to be performed on the mobile device 106.

The webpage server 104 is a computing device configured to distribute one or more webpages to one or more mobile devices 106. An example computing device is described with respect to FIG. 6. For example, the webpage server 104 may be a server or plurality of servers configured to provide a plurality of webpages to any devices from which requests originate. In one embodiment, the webpage server 104 distributes a webpage over the network 102 and makes the webpage available to the mobile device 106. The webpage server 104 may be notified that a webpage is malicious. In response, the webpage server 104 may perform various actions including denying access to the webpage, deletion of the stored webpage content, or reporting the issue to an administrator, webpage owner, or webpage developer. Such an action may be permanent or temporary, for example, until the malicious content of the webpage is removed.

The behavioral analysis server 108 is a computing device configured to analyze webpages for malware. In one embodiment, the behavioral analysis server 108 analyzes a webpage from the webpage server 104 prior to the webpage server 104 making the webpage available to the mobile device 106. Alternatively, webpages may be analyzed after distribution to one or more mobile devices 106 has occurred. In one embodiment, a webpage is visited by software on the behavioral analysis server emulating the operating system and a web browser of the mobile device 106. Various input permutations may be performed to analyze the resulting behavior of the web browser after accessing the webpage. The resulting behavior may include signals indicating the webpage is likely to contain malware.

In one embodiment, soft signal and hard signal classifications are assigned to behaviors to indicate a likelihood that a certain behavior is due to malware on the webpage being tested. Additionally, in one embodiment, detected soft signals and hard signals can be combined to determine an overall likelihood of the tested webpage containing malware.

Upon reading this disclosure, one of ordinary skill in the art will understand that the description above includes three mobile devices 106a-c, one webpage server 104 and one behavioral analysis server 108 for the purposes of illustration. In other embodiments, any number of each of these components may included in the computing environment illustrated by FIG. 1

Behavioral Analysis Server Configuration

Figure 2:
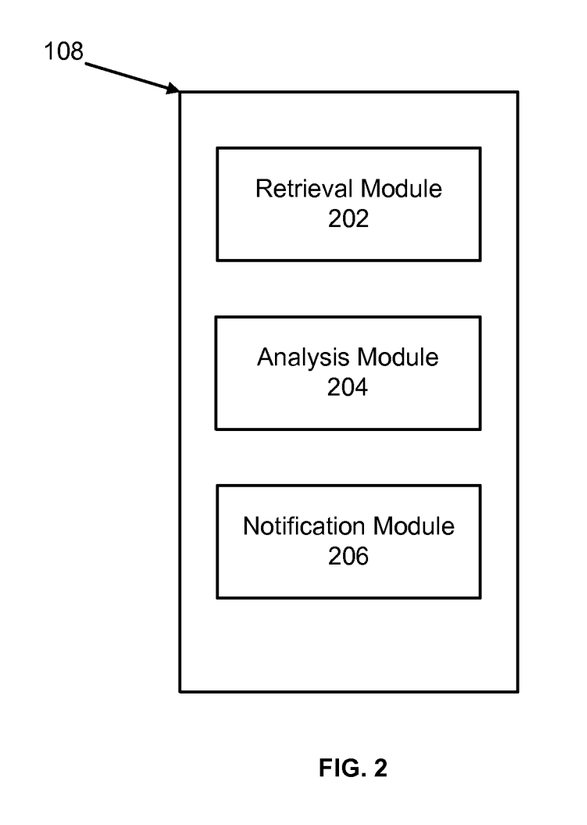
FIG. 2 is a block diagram illustrating a behavioral analysis server according to one embodiment of the present disclosure.

FIG. 2 is a block diagram illustrating the behavioral analysis server 108 according to one example embodiment of the present disclosure. The behavioral analysis server 108 comprises a retrieval module 202, an analysis module 204 and a notification module 206.

The retrieval module 202 receives webpages from the webpage server 104 to allow the behavioral analysis server 108 to analyze a webpage for malware. In one embodiment, a webpage is automatically retrieved by the retrieval module 202 by scanning webpages available from the webpage server 104 for webpages that have not yet been analyzed by the behavioral analysis server 108 or webpages which have been updated since the previous analysis. Webpages may download plug-ins and other information from third party sources, increasing the usefulness of repeated scans. Even if a webpage hasn't been updated, the third-party resources it retrieves may have been updated and contain malware increasing the usefulness of frequent scanning. In another embodiment, the webpage server 104 is configured to transmit a webpage to the behavioral analysis module 108 for analysis before making the webpage available to the mobile device 106. Analysis of a webpage may be performed before or after the webpage has been accessed by one or more of the mobile devices 106.

The analysis module 204 performs behavioral analysis on a webpage retrieved by the retrieval module 202. In one embodiment, both static and behavioral analyses are performed by the analysis module 204 to properly assess whether a webpage contains malware. A web browser is run in an emulated software platform and the webpage is accessed by the web browser. A wide range of inputs may be simulated in order to monitor the resulting behavior of the webpage. In one embodiment, input is not simulated beyond loading the webpage on the simulated web browser since a malicious action may be triggered by simply visiting the webpage.

An emulator can be built from a stock mobile device emulator, and modified to form a mobile sandbox. The sandbox allows for testing of particular configuration of a mobile device when that device accesses a webpage without having to actually access the webpage on the physical device itself. In one embodiment, a virtual machine runs a mobile operating system, which in turn uses the WEBKIT browser engine to access webpages. Plug-ins may also be installed which correspond to typical hardware deployments. The sandbox includes hooks for key application programming interfaces (APIs) that code in (or on) a webpage might communicate through, e.g., calls sent or received. Examples of APIs include those that are used to access a file system, access contacts in an address book, interface with an SMS text subsystem, a interface with a wireless fidelity (WiFi) system, interface with a telephony system, or enable or disable a camera. In one embodiment, the sandbox is also configured to observe a mobile device's network behaviors, application or operating system graphical user interface and other aspects for blackbox monitoring, in addition to monitoring of API calls.

With the sandbox configured, the analysis module 204 observes behaviors occurring after accessing a webpage. These behaviors may be classified as unsuspicious, soft signals, or hard signals. In one embodiment, these classifications are assigned based on a behavior's likelihood of being performed due to malware on the webpage. Additionally, multiple classified behaviors may be combined to determine an overall risk or likelihood of malware being present in the webpage. The analysis module 204 is discussed in more detail in FIG. 3.

The notification module 206 is configured to take action based on the results of the analysis module 204. For example, if the webpage is determined to likely contain malware, the webpage server 104, or an administrator of the webpage server 104, may be notified of the malware. Additionally, the notification module 206 may notify mobile devices 106 that have visited the webpage, if that information is available, that the webpage has been found to contain malware. The notification may also include instructions on how to eliminate or reduce the threat posed by the detected malware.

Figure 3:
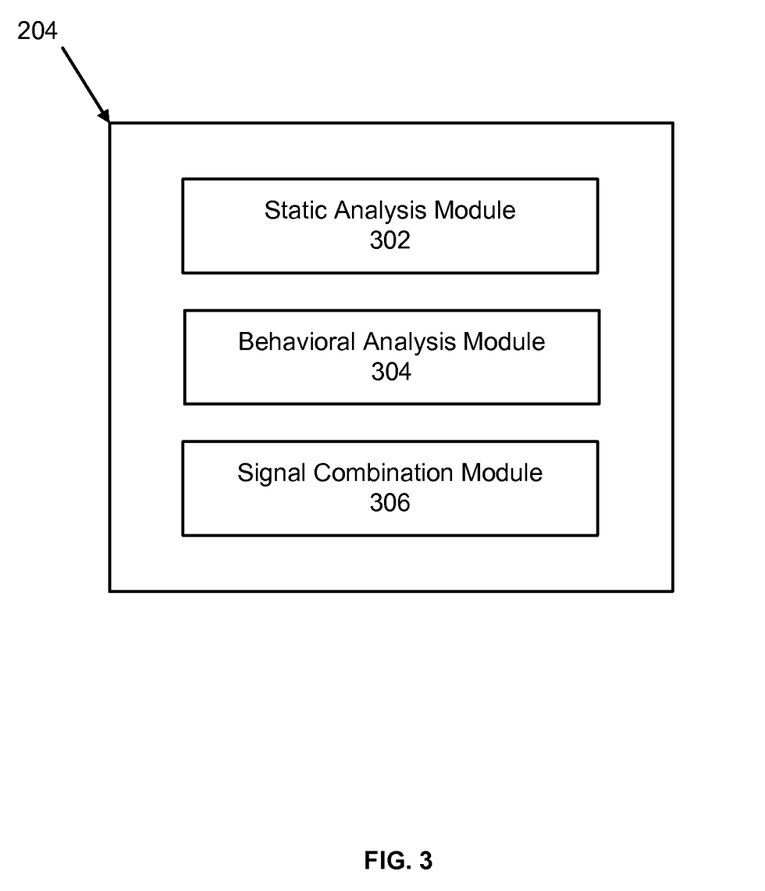
FIG. 3 is a block diagram illustrating an analysis module according to one embodiment of the present disclosure.

Turning now to FIG. 3, the analysis module 204 is further described. The analysis module 204 comprises a static analysis module 302, a behavioral analysis module 304 and a signal combination module 306.

The static analysis module 302 optionally performs a static analysis on a webpage to enable behavioral analysis of the webpage. In one embodiment, the webpage is analyzed for any signs of malware, or conditions that should be simulated during behavioral analysis. For example, it may be apparent that the webpage will perform differently in different web browsers or versions of web browsers or on different mobile operating systems or platforms. By determining conditions which affect the behavior of the webpage, the static analysis module 302 can attempt to place an emulated mobile device in various states that might cause suspicious actions to be performed by the webpage which can be classified as hard signals or soft signals.

In addition, the static analysis module 302 determines the emulator environment that should be used to properly test the behavior of a webpage. In one embodiment, the emulator environment is controlled for operating system and operating system version of the mobile device, other applications installed, and hardware features or revisions. The emulator environment can retrieve and store multiple versions (and if applicable, release or revision level) of operating systems and mobile applications to ensure that a wide variety of platform configurations can be simulated during behavioral testing. Certain applications, or versions of operating systems or applications may need to be installed for an application to exhibit behavior that may be classified as a hard or soft signal and therefore indicative of malware being present. In one embodiment, the emulated environment includes seed information such as contacts in an address book, seeded global positioning system (GPS) locations, internet history, and other information better simulating an actual user's device. This better enables to the emulator to make an application exhibit a wide range of behaviors during behavioral analysis.

Behavioral analysis module 304 performs a series of steps to recognize hard and soft signals indicative of the webpage containing malware. An image of the emulated environment determined in static analysis is loaded allowing the webpage to be tested under proper conditions. A sample of the webpage is then visited by one or more web browsers on the emulated environment. The behaviors such as system calls or actions resulting from visiting the webpage can then be observed. In one embodiment, a debugging utility, such as STRACE is utilized to monitor system calls made by the webpage. This enables system calls, actions, and other behaviors of the web browser or simulated mobile device to be stored during behavioral analysis. The observed behaviors may then be analyzed and classified as hard or soft signals.

Signal combination module 306 combines multiple behaviors signals to determine an overall likelihood that a webpage is malicious. In one embodiment, some system calls or actions simulated in the emulated environment may be classified as soft signals or hard signals. In one embodiment, soft signals comprise system calls or actions which have an associated probability of the webpage containing malware. Hard signals comprise system calls or actions that are by definition malicious actions, or associated with a probability of the webpage containing malware, the probability exceeding a hard signal threshold. For example, a soft signal may be observing a web browser crashing. This action may be used for malicious purposes, but is often benign. On the other hand, if after the browser crash, the mobile device begins making, or attempting to make, outbound connections to known malicious IP addresses, the signal may be classified as a hard signal due to the small probability of benign software performing such an action. In addition, the cause of a behavior resulting from visiting a web page can affect the probability that the webpage is malicious. For example, whether a webpage includes static HTML, dynamic JAVASCRIPT, various plug-ins, and any other programming languages may affect the probability that an action is malicious. In one embodiment, the same behavior may result in different probabilities of maliciousness based on the programming languages and plug-ins determined to be on the web page during static analysis. For example, a behavior might have a lower probability of maliciousness if the webpage causing it has only static HTML.

In one embodiment, if a hard signal is observed in a webpage, the webpage is classified as malicious. This may be due to a probability of malicious content exceeding a predefined threshold or threshold value of what comprises or corresponds with malicious content. Alternatively, it may be due to being innate in the action performed according to the hard signal.

Likewise if one or more independent soft signals are observed, each of the soft signals has their own probability of indicating that a webpage is malicious. According to one embodiment, the probability of maliciousness, X, that a webpage is malicious when a single independent soft signal is observed is shown in equation (1) below, where P is the overall probability that any webpage contains malware without specific information about the webpage, D is the detection rate or probability that the soft signal is observed for a malicious webpage, and F is the false positive rate or probability that the soft signal is observed for a legitimate webpage.

$$X=(D*P)/(D*P+F*(1-P)) \quad (1)$$

The equation indicates that both the detection rate and false positive rate of observed soft signals are taken into account. A signal with a high detection rate and a low false positive rate increases the probability of maliciousness when the signal is observed. The probability of maliciousness of multiple soft signals may then be taken into account to determine a combined probability of maliciousness. It should be noted that equation 1 and the related discussion is merely an example of probability calculations that may be used if the soft signals are all independent. In one embodiment, the webpage is identified as malicious if the combined probability of maliciousness exceeds a threshold. In one embodiment, the threshold is the same threshold of probability used to classify an individual signal as a hard signal. Alternatively, the probability of maliciousness threshold for a hard signal may be higher or lower than the combined probability of maliciousness threshold. In one embodiment, soft signals are not independent, but rather their associated probability of maliciousness varies based on other soft signal that are observed in an application.

Figure 4:
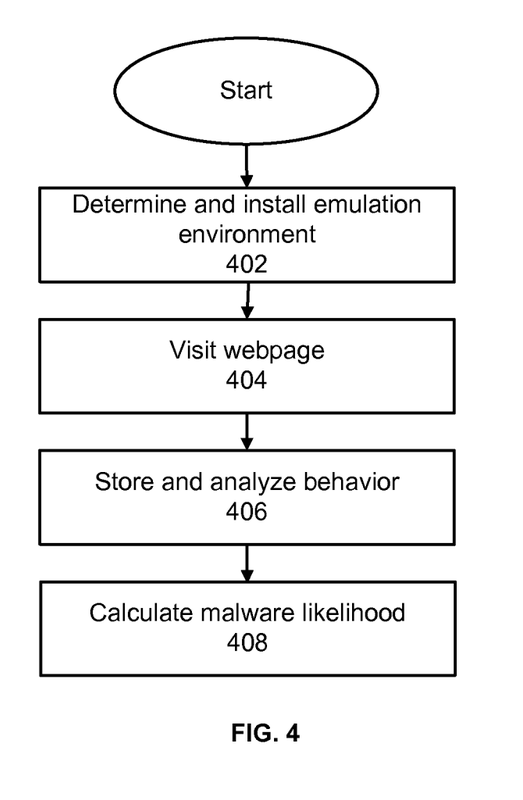
FIG. 4 is a flow diagram illustrating a method for performing malware detection analysis according to one embodiment of the present disclosure.

Referring now to FIG. 4, a flow diagram illustrates an example method for performing webpage malware analysis according to one embodiment of the present disclosure. After receiving a webpage sample or URL for analysis, the analysis module 204 determines 402 the emulation environment in which the webpage should be tested. The appropriate, operating system, web browser, and other software and settings are installed and configured according to the emulation environment. The sample webpage is then visited 404 on the emulated image of the mobile device conforming to the previously determined emulation environment. Analysis module 204 then stores and analyzes 406 the behavior of the mobile device after visiting the webpage to identify behaviors which may be classified as soft signals and hard signals. Analysis module 204 calculates 408 the likelihood of the webpage sample containing malware based on the soft and hard signals identified in recorded behaviors. The result of analysis may be reported to the webpage server 104 and/or the mobile device 106 to inform whether a webpage is malicious and, optionally, the probability that the webpage is malicious.

Figure 5:
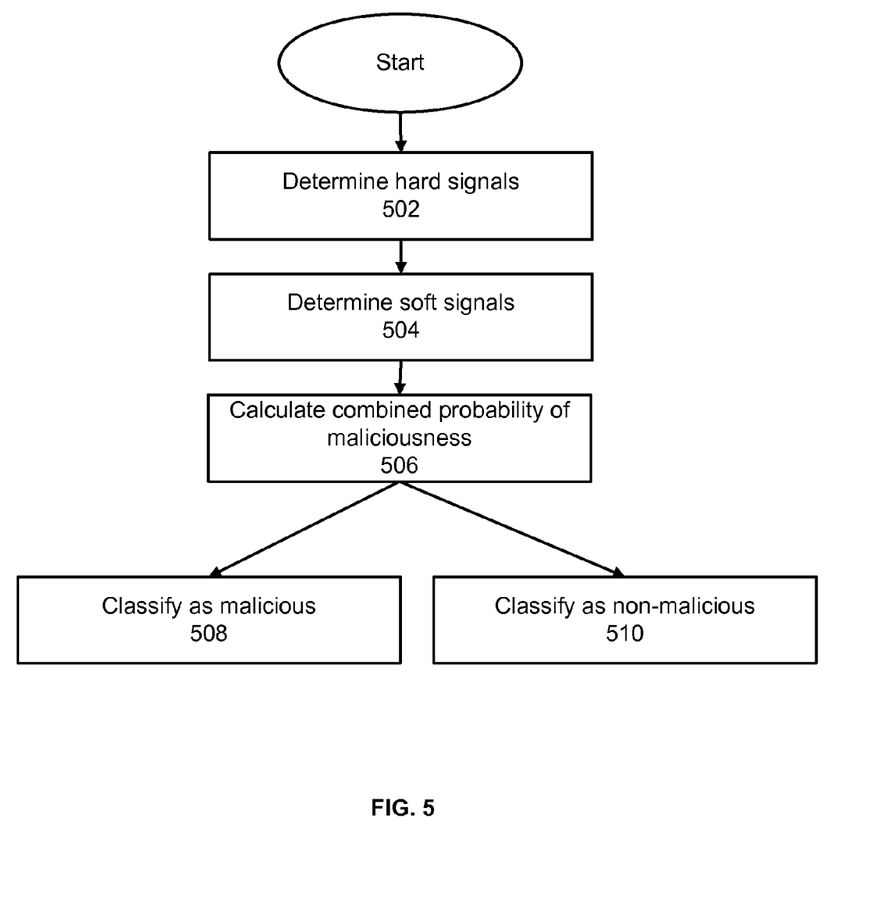
FIG. 5 is a flow diagram illustrating a method for combining hard and soft signals to determine a likelihood of malware according to one embodiment of the present disclosure.

FIG. 5 is a flow diagram illustrating an example method for combining hard and soft signals to determine a likelihood of malware according to one embodiment of the present disclosure. After the analysis module 204 observes behaviors and classifies hard and soft signals, the analysis module 204 proceeds to assess the likelihood of a webpage being malicious based on hard and soft signal infection rates and false positive rates. In one embodiment, analysis module 204 determines 502 observed hard signal behaviors and determines a probability of maliciousness for each of the hard signals. Similarly, analysis module 204 determines 504 observed soft signal behaviors and determines a probability of maliciousness for each of the soft signals. In one embodiment, as previously discussed, individual hard signals have a probability of maliciousness high enough to classify the webpage as malicious. On the other hand, the probability of maliciousness for each of the observed soft signals is combined to calculate 506 a combined probability of maliciousness. If hard signal is observed, or if the combined probability of maliciousness exceeds a maliciousness threshold, the webpage is classified 508 as malicious. If no hard signal is observed, and if the combined probability of maliciousness fails to exceed the maliciousness threshold, the webpage is classified as non-malicious.

Example Computing Architecture

The entities shown in FIGS. 1-5 are implemented using one or more computers. A computer used to implement these entities may take on a variety of form factors. For example, in on embodiment, mobile device 106 is a smartphone configured to access webpages downloaded over the network 102. FIG. 6 is a high-level block diagram illustrating an example computer 600. The computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer 600 have different architectures.

The storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, or other type of pointing device, and is used in combination with the keyboard 610 to input data into the computer system 600. The graphics adapter 612 displays images and other information on the display 618. The network adapter 616 couples the computer system 600 to one or more computer networks.

The computer 600 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 608, loaded into the memory 606, and executed by the processor 602.

The types of computers 600 used by the entities of FIGS. 1-5 can vary depending upon the embodiment and the processing power required by the entity. For example, the behavioral analysis server 108 might comprise multiple blade servers working together to provide the functionality described herein. The computers 600 can lack some of the components described above, such as keyboards 610, graphics adapters 612, and displays 618.

Additional Considerations

The disclosed configurations beneficially provide malware detection that can be applied with or without static malware detection to evaluate whether a particular webpage contains potentially harmful malware when accessed from a web browser on a mobile device. In one example embodiment, the behavioral detection is performed on a software emulation platform. In this configuration, the system is structured to customize the emulated environment, record the observed output or behaviors, analyze the impact of the observed output, and optionally provide suggested course of action.

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions, like the processes described in FIGS. 4-5, are presented in terms of algorithms and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The operations described herein can be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

Also, some embodiments of the system, like the ones described in FIGS. 2-3, may be further divided into logical modules. One of ordinary skill in the art will recognize that a computer or another machine with instructions to implement the functionality of one or more logical modules is not a general purpose computer. Instead, the machine is adapted to implement the functionality of a particular module. Moreover, the machine embodiment of the system physically transforms the electrons representing various parts of content and data representing user interaction with the content into different content or data representing determined resonance.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for detecting and analyzing potential malware on websites through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for analyzing webpages for malware, the method comprising:
    receiving a uniform resource locator (URL);
    performing analysis on a webpage associated with the URL to determine programming languages and plug-ins used on the webpage;
    accessing the webpage on a web browser in an emulated environment, the emulated environment simulating a mobile device;
    observing and storing behaviors of the simulated mobile device after accessing the webpage; and
    classifying the mobile webpage as malicious or non-malicious based on the observed and stored behaviors.

2. The method of claim 1, wherein observed behaviors of the simulated mobile device are classified as soft signals or hard signals.

3. The method of claim 2, wherein the classification of a behavior as a soft signal or a hard signal is based on the behavior's likelihood of being performed due to malware on the webpage.

4. The method of claim 1, wherein a mobile webpage is classified as malicious in response to a combined probability of maliciousness for multiple soft signals exceeding a threshold.

5. The method of claim 1, wherein a mobile webpage is automatically classified as malicious in response to at least one behavior being classified as a hard signal.

6. A non-transitory computer readable storage medium storing program code for analyzing webpages for malware, the program when executed by at least one processor causing the processor to:
    receive a uniform resource locator (URL);
    perform analysis on a webpage associated with the URL to determine programming languages and plug-ins used on the webpage;
    access the webpage on a web browser in an emulated environment, the emulated environment simulating a mobile device;
    observe and storing behaviors of the simulated mobile device after accessing the webpage; and
    classify the mobile webpage as malicious or non-malicious based on the observed and stored behaviors.

7. The computer readable storage medium of claim 6, wherein observed behaviors of the simulated mobile device are classified as soft signals or hard signals.

8. The computer readable storage medium of claim 7, wherein the classification of a behavior as a soft signal or a hard signal is based on the behavior's likelihood of being performed due to malware on the webpage.

9. The computer readable storage medium of claim 6, wherein a mobile webpage is classified as malicious in response to a combined probability of maliciousness for multiple soft signals exceeding a threshold.

10. The computer readable storage medium of claim 6, wherein a mobile webpage is automatically classified as malicious in response to at least one behavior is classified as a hard signal.

11. A system comprising:
    a computer processor; and
    a malware analysis module executing on the computer processor and configured to:
        receive a uniform resource locator (URL);
        perform analysis on a webpage associated with the URL to determine programming languages and plug-ins used on the webpage;
        access the webpage on a web browser in an emulated environment, the emulated environment simulating a mobile device;
        observe and storing behaviors of the simulated mobile device after accessing the webpage; and
        classify the mobile webpage as malicious or non-malicious based on the observed and stored behaviors.

12. The system of claim 11, wherein the malware analysis module is further configured to classify observed behaviors of the simulated mobile device as soft signals or hard signals.

13. The system of claim 12, wherein the malware analysis module is further configured to classify a behavior as a soft signal or a hard signal based on the behavior's likelihood of being performed due to malware on the webpage.

14. The system of claim 11, wherein the malware analysis module is further configured to classify a mobile webpage as malicious in response to a determination that a combined probability of maliciousness for multiple soft signals exceeds a threshold.

15. The system of claim 11, wherein the malware analysis module is further configured to automatically classify a mobile webpage as malicious in response to at least one behavior being classified as a hard signal.

* * * * *